Sept. 19, 1967    H. SHINDELL    3,342,340
WATER CONDITIONING APPARATUS
Filed Feb. 27, 1964    3 Sheets-Sheet 2
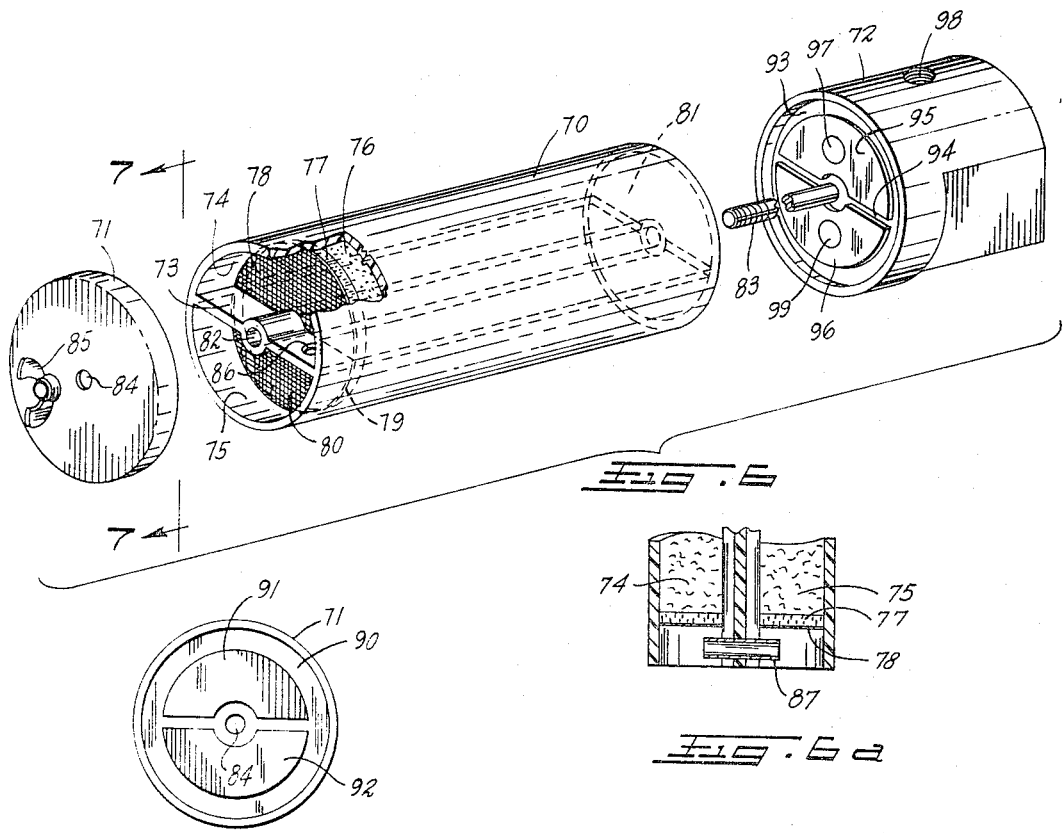
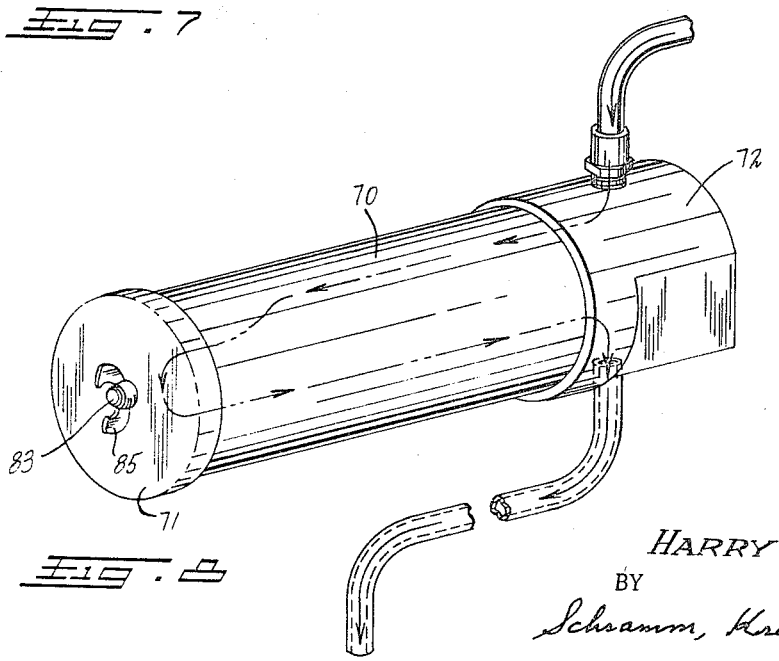
INVENTOR.
HARRY SHINDELL
BY
Schramm, Kramer & Sturges
attorneys

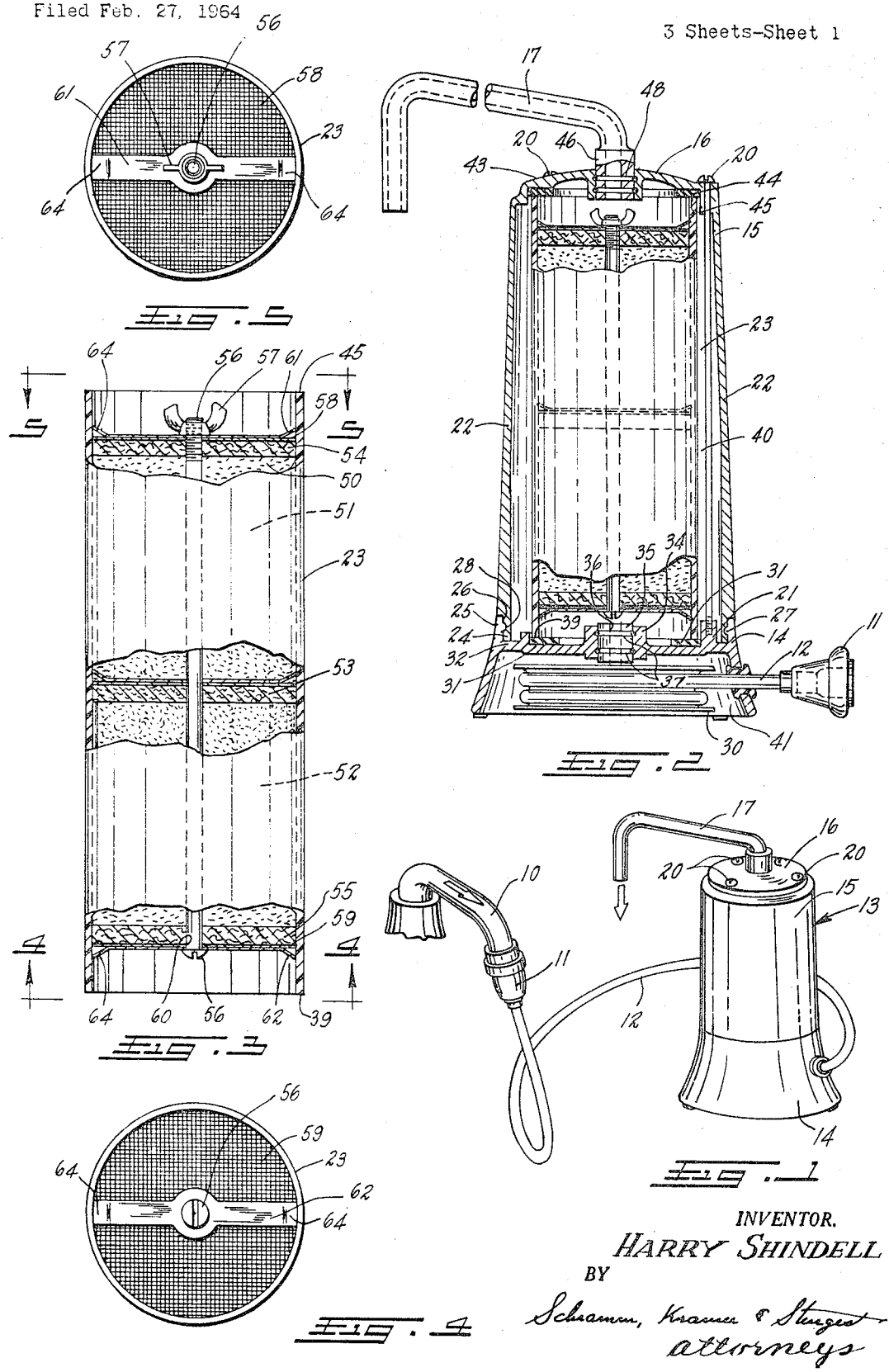

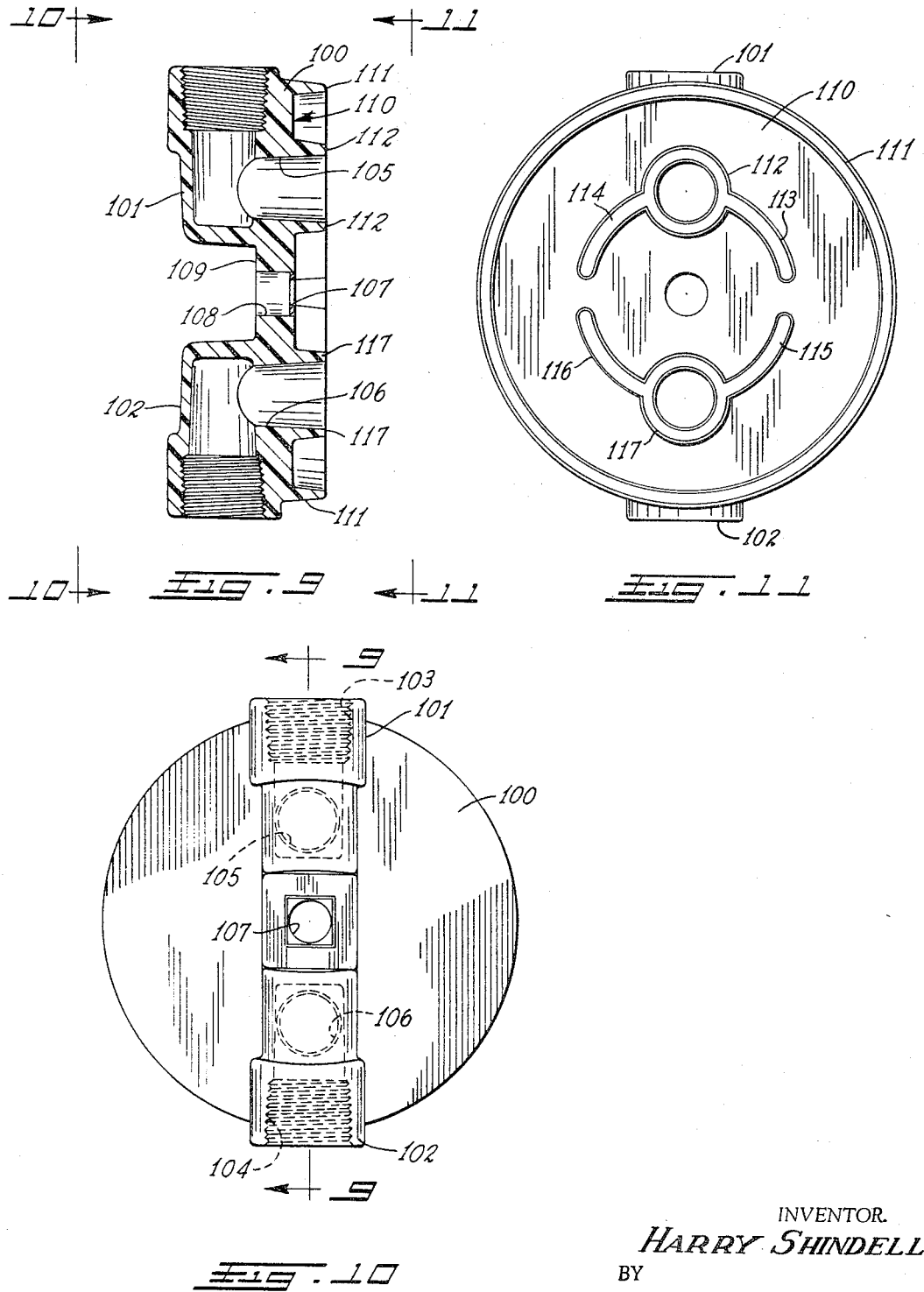

United States Patent Office 3,342,340
Patented Sept. 19, 1967

3,342,340
WATER CONDITIONING APPARATUS
Harry Shindell, Toledo, Ohio, assignor to Eaton Yale & Towne Inc., a corporation of Ohio
Filed Feb. 27, 1964, Ser. No. 347,915
1 Claim. (Cl. 210—282)

This invention relates, as indicated, to water treating apparatus, and more particularly, to apparatus of either a portable or a fixed character including a readily removable and replaceable water conditioning unit, and adapted for commercial or domestic use in receiving water from a source, conditioning the water by physical and/or chemical means, and delivering beneficiated water.

Water from nearly every known source is subjected to treatment of various kinds to render it more suitable for use. Such treatments run a gamut from the exacting requirements of an aqueous medium for use in scientific studies through the varied demands imposed by human or animal consumption, to waters which are used solely for cooling in industrial applications. Still other treatments are often imposed after such aqueous media have been put to its myriad uses, such as for example, anti-pollution treatment. Desalination, demineralization, desulphurization, dehalogenation, decoloration, deodorization, naturalization, and the like are well known pre-use and post-use water treatments.

While the agents for treating each of the problems with aqueous media are well known, the utilization thereof usually involves apparatus which is either too large or too inconvenient for widespread small scale consumer use.

The present invention provides a simple apparatus which is especially adapted for small scale consumer use, for conditioning water from a source by intimately contacting it with any one or more of a variety of physical and/or chemical treating agents to alter its composition in a desired manner. For example, municipal water often contains quantities of chlorine offensive to some. Well water may contain sulphurous components, or "hardness," or iron, which stains clothing, etc. all of which are annoying to the home owner dependent on such source. By means of the apparatus herein described, water containing these or other annoying contaminants may be conditioned in a small unit having a readily replaceable conditioner cartridge, so as to render it more suitable for the intended use.

To the accomplishment of the foregoing and related ends, said invention, then, consists of the means hereinafter fully described and particularly pointed out in the appended claims, the following description and annexed drawings setting forth in detail certain illustrative embodiments of the invention, such disclosed means constituting, however, but a few of the various forms in which the principle of this invention may be employed.

Briefly stated, the present invention is in the provision of an improved water conditioning apparatus including a removable and replaceable water conditioning unit. The replaceable unit is characterized by a rigid hollow casing having separable closure means at each extremity.

The hollow casing is separated into two separate chambers by means of a divider which may extend either transversely of the casing or longitudinally thereof. In each chamber there is disposed granular water conditioning material or materials. Means are provided which coact with the inner walls of each chamber for maintaining the water conditioning material in each chamber under a compressive force. Means are provided adjacent at least one extremity of each of said chambers for interrupting and distributing the flow of water through the apparatus.

In an embodiment of this invention which is portable, the rigid hollow casing is disposed within a housing, preferably of ornamental design, one of the closure members adapted to form a base, and the other closure member being provided with a fitting through which the filtrate may exit from the unit. In another embodiment of the invention particularly adapted for permanent installation in a water line, for example, the external housing may be omitted, and one closure member adapted to be fitted into a water line including means for letting fluid into the water conditioning apparatus and means for exiting filtrate therefrom.

These structures are not limited to use in a vertical position and in either portable or fixed form may be installed so that water flows, vertically, horizontally or any intermediate position without adverse effect.

The invention may be better understood by having reference to the annexed drawings which illustrate preferred portable and fixed embodiments of the invention, it being understood that other embodiments employing the same principles may be made as will become readily apparent to those skilled in the art.

In the annexed drawings:

FIG. 1 is an illustration of a portable embodiment of the present invention showing the attachment thereof to a conventional kitchen sink swingable water spout by a flexible hose and coupler, and a discharge spout for conditioned water.

FIG. 2 is a cross-sectional view, on an enlarged scale, of the apparatus illustrated in FIG. 1 and showing flexible hose storage means in the base, the casing, the exit spout, and the removable cartridge containing the water conditioner or conditioners in partial cross-section.

FIG. 3 is an elevation of a removable and replaceable cartridge adapted for use in either a portable unit as shown in FIGS. 1 and 2, or a fixed unit; and showing in partial cross-section the details of the terminal fluid distributing pads, means for dividing the cartridge into two separate compartments or chambers, retaining screens and springs, and a retaining and pressurizing bolt and nut assembly.

FIG. 4 is an end view of the cartridge of FIG. 3 taken in the plane indicated by the line 4—4 of FIG. 3.

FIG. 5 is an end view of the cartridge of FIG. 3 taken in the plane indicated by the line 5—5 of FIG. 3.

FIG. 6 is an exploded view of a water conditioning apparatus adapted for permanent installation in a water line showing a tapped inlet-outlet fitting or closure-header, a replaceable cartridge, an end cap divider means, intermediate fluid distributing means and the retaining nut and bolt.

FIG. 6a is a fragmentary cross-sectional view of another cartridge similar to that shown in FIG. 6 and having a tubular transferring orifice extending through the web for transferring fluid from one compartment to the adjacent compartment.

FIG. 7 is an elevation of the cartridge cap or cover taken in the plane indicated by the line 7—7 in FIG. 6.

FIG. 8 is an illustration of the apparatus of FIGS. 6 and 7 in assembled condition and installed in a water line, partially shown.

FIG. 9 is a cross-sectional view of another inlet-outlet fitting or closure-header for the permanent installation type of water conditioning apparatus, and is taken in the plane indicated by the line 9—9 of FIG. 10.

FIG. 10 is a top elevation of the inlet-outlet fitting shown in cross section in FIG. 9.

FIG. 11 is a plane view of the underside of the inlet-outlet fitting shown in FIGS. 9 and 10.

Referring now more particularly to the annexed drawings, FIG. 1 shows an illustration of one embodiment of the present invention of the type which is particularly adapted to be used in conjunction with a kitchen water spout of conventional design. Accordingly, there is shown in FIG. 1 a swingable water spout 10 of the kitchen sink fixture variety coupled by means of a coupler 11, also of conventional design through a flexible tube 12 to a portable water conditioning unit 13 of the present invention having a base 14, a housing 15 and a cap 16 from which there extends a swingable water spout 17. Coupler 11 may be provided with a plunger adapted to coact with fluid diverting means for directing fluid entering the coupler either through an outlet into the sink as in a normal spout, or through flexible tube 12 into the water conditioning unit. Such flow switching means are conventional and may be used in conjunction with the water conditioning apparatus hereof to enable selective use thereof thereby avoiding disconnecting the coupler in order to use untreated water.

FIGS. 2 to 5 show in greater detail the structure of the portable unit illustrated in FIG. 1. Accordingly, the water conditioning unit generally indicated at 13 is composed of a housing 15 secured to the base 14 by any suitable means such as elongated threaded bolts 20 coacting with internally threaded projections 21 which are integral with the base 14. Cap 16 is provided with depending skirt portions 22 which serve to enclose a removable water conditioning assembly 23 and the retaining bolts 20 and to provide a decorative body for the apparatus. The lower marginal extremities of the skirt portion 22 are provided with any suitable connecting means for ornamental coaction with the base, such as a lap joint 24 formed by an upstanding rim 25 integral with the base 14 and an annular recess 26 in the skirt 22. Frictional retaining means such as the bead 27 integral with the rim 25 and a corresponding annular groove 28 in the recess 26 may be provided to facilitate assembly of the housing 15 to the base 14. In the embodiment shown in FIG. 1, the base 14 also serves as a housing for a flexible hose 12 which is wound upon a take-up reel 30 rotatably mounted within the base, and preferably spring loaded so as to provide for automatic reeling in of the flexible hose 12 when disconnected from the water spout 10.

The housing 14 is also provided with closure means for one extremity of the replaceable water conditioning unit, such closure means including a plate 31 having upstanding rim 32, and a gasket 33 for sealing coaction with the lower extremity of the water conditioning cartridge or assembly 23. Plate 31 is also provided with means for letting water into the conditioning cartridge and including a built-up integral bearing 34 having journaled therein for rotation shaft 35 which is in turn provided with axial bore 36 through which water from flexible hose 12 is admitted to the cartridge 23. Sealing means, e.g. O-rings 37 are provided to permit rotation of shaft 35 to which reel 30 is affixed while maintaining a fluid tight seal between the cartridge chamber 40 and the reel chamber 41.

Similar closure means are provided for the upper extremity of the cartridge 23, the cap 16 being provided with a suitable annular recess 43 in which there is seated a gasket 44 adapted for sealing engagement with the finished upper exttremity 45 of the cartridge 23. Water outlet means are provided in the cap 16, these means including a bearing 45 and a shaft 46 journaled therein for rotation and having sealing means in the form of O-rings 48 secured therein to prevent loss of filtered water through this opening. Shaft 46 is integral with nozzle 17 which may be rotated through 360°.

Thus, when the cartridge 23 is disposed with its lower peripheral edge 39 in contact with the annular gasket 33, and the housing 22 including cap 16 and gasket 44 put into position over the cartridge 23, tightening of the longitudinal bolts 20 effects a fluid tight engagement between the gaskets 33 and 44 and the lower peripheral extremity 39 and the upper peripheral extremity 45 of the cartridge 23, respectively. Fluid entering the cartridge at the lower extremity thereof is forced by line pressure upwardly through the water conditioning apparatus including cartridge 23 and conditioned water exits through outlet nozzle or spout 17.

Referring more particularly to FIGS. 3–5, there is here shown on somewhat enlarged scale the details of the cartridge 23. Cartridge 23 is conveniently in the form of a tube open at both ends, the upper and lower extremities 45 and 39, respectively being shaped for sealing coaction with gaskets 44 and 33 respectively. Cartridge 23 may be formed of extruded plastic material of round, square, or rectangular cross section. The water conditioning medium 50 may be any conventional material or plurality of materials in granular form which is adapted to alter the composition of the aqueous solution in such a way as to provide an improved aqueous filtrate. Numerous water treating materials are known and are available in granular form suitable for inclusion in the water conditioning cartridges of the present invention. Notable among these are activated carbon granules, granular zeolites, granular ion-exchange resins, granular clay, e.g. fuller's earth, and the like, all of which materials are well known and conventionally used for treating aqueous media. These granular materials may be used independently in isolated sections of the cartridge. For example, in the embodiment shown in FIGS. 2 and 3 the cartridge is divided into two sections 51 and 52. The lower section 52 may be filled with, for example, granular ion-exchange resin for the purpose of removing naturally occuring hardness from the water. Upper section 51 may be filled with granular activated carbon for the purpose of removing dissolved halogens, organic matter, and odor or color imparting bodies. Chambers 51 and 52 are conveniently isolated by means of a resilient pad 53 which also serves as an intermediate fluid distributing means by interrupting the flow pattern of the liquid and minimizes channeling in the conditioning medium. There are also provided at each extremity of the water treating zones 51 and 52 resilient pads 54 and 55. Resilient pads 53, 54 and 55 serve to retain the granular water conditioner in each of the chambers or zones 51 and 52, and are conveniently formed from a fibrous resilient material inert to water and water contaminates commonly found in solution in the water. Best results have been secured with fibrous polypropylene and fibrous polyethylene.

The resilient pads 53, 54 and 55 are sufficiently porous so as to offer minimum resistance to the passage of fluid therethrough yet effective to distribute the fluid and interrupt flow patterns which may have become fixed due to channelizing in the first portion of the divided conditioning medium. Pads 53, 54 and 55 are also sufficiently rigid to permit the application of compressive forces on the water conditioning medium through the application of axial pressure by any suitable means, such as by means of an axial bolt 56 threaded at its extremity and fitted with wing nut 57. Resilient pads 54 and 55 are contained between perforated retainer plates 58 and 59 which are substantially more rigid than the pads 53, 54 and 55. Retainer plates 58 and 59 may be a heavy screen material, e.g., brass woven wire mesh cloth, having a centrally located aperture 60 therethrough to permit passage of the bolt 56. In order to distribute the compressive force exerted by the nut 57 in cooperation with the bolt 56 over a larger area, there are conveniently provided diametral spring members 61 and 62 which are also punched to permit passage of the bolt 56 therethrough. The extremities of the spring members 61 and 62 are bent out of the plane thereof to provide lips 64 adapted for wedging coaction with the inner side walls of the tubular cartridge member 23. Spring retainer members 61 and 62 may desirably be cut so as to exceed slightly the internal diameter of the tubular cartridge member 23. Thus, because of the spring-like nature thereof, the extremities "bite" into the inner wall surface and are rigidly held against outward axial displacement. Alternatively, the screens or retainer plates 58 and 59 may be slightly oversized and pressed into position within the cartridge body 23. The same wedging action can be utilized to hold the retainer plates in position and to exert pressure on the granular filter or conditioning materials. Twenty foot-pounds pressure is sufficient for sitting the screens or retainer plates 58 and 59 in conjunction with the spring members 61 and 62 at the opposite extremities of the cartridge. If, as indicated above, screens 58 and 59 are oversized, the same pressure may be applied to the screen members for asserting a suitable compressive force on the granular body, and the spring members 61 and 62 omitted.

One of the principal difficulties with prior water conditioning devices has been the tendency of granular materials to "channel." When a liquid medium flows through a bed of material the path of least resistance is gradually erroded to form a "channel" through the fixed bed, and substantial proportions of the medium will traverse such channels without necessarily undergoing the physical and/or chemical conditioning which is desired. The end resilient pads 54 and 55, and the intermediate resilient divider 53 serve to interrupt the fluid flow pattern and so distort it as to minimize the channelizing effect thereof. Moreover, the application of the pressure to the conditioning medium by means of the bolt 56 and the adjustable nut 57 also contribute to this end. It will be seen from FIGS. 2 through 5 that the cartridge unit of FIGS. 3 to 5 may be conveniently removed from the housing 22 by removal of bolts 20 and disengagement of the skirt 22 from the base flange 25, and an unused water conditioning cartridge unit inserted in its place. A primary advantage of this structure is that the cost of manufacture of the replaceable water conditioning cartridge unit is so low that it may be disposed of and replaced as a complete unit thereby facilitating the replacement problem from the standpoint of the home owner and rendering practicable small scale water conditioning units for home use.

The principles of the present invention may also be embodied in a device which is adapted to be inserted in a water pipe line and which is accordingly not portable. This structure is shown in exploded form in FIG. 6, and illustrated as an assembled device in a water line in FIG. 8. This structure differs somewhat from the previous device in that the fluid, instead of traversing the water conditioning cartridge from one extremity where it is admitted to the other extremity, reversing means are provided adjacent the normal exit extremity to reverse the fluid flow direction within the cartridge and cause it to exit through the same extremity by which it gained entrance. The structure is divided by an axially extending partition instead of a transversely extending pad such as pad 53 in FIG. 3 so that, if desired different water conditioning media may be exposed to the aqueous medium sequentially. Intermediate fluid distributing or flow pattern interrupting means are provided at the flow direction reversing extremity. With such a side-by-side structure, the axial length of the device may be materially lessened so that the overall length of the cartridge may be up to one half the length of series arranged filter media.

Referring now more particularly to FIGS. 6 to 8, the non-portable structure includes a tubular replaceable cartridge member 70, a distal closure cap 71 and a combined proximal closure-fluid passage fitting or closure-header 72. The details of distal closure 71 are shown in the plan view, FIG. 7.

Cartridge body 70 is again, a tubular member having a diametral divider or web 73 axially extending between the extremities of tube or body 70 and dividing the interior into two non-communicating chambers 74 and 75. Like cartridge body 23 (FIG. 3), cartridge body 70 may be formed of extruded plastic material and have a round, square, or rectangular cross section. Chambers 74 and 75 are each partially filled with a suitable granular water conditioning material, for example conditioning material 76 disposed in chamber 74. In like manner, the same or different granular material is disposed in chamber 75 partially filling the same. The granular material is confined between semi-circular resilient pads at each extremity thereof such as resilient pad 77, and porous rigid screen 78 confining the granular material 76 in the chamber 74. In like manner, resilient pad 79 and porous rigid screen 80 confine the granular material within chamber 75. Similar closure means (not shown) are provided at the opposite extremity 81. Rigid screen members 78 and 80, and the corresponding screen members at the proximal extremity 81 are slightly oversized for the geometric configuration of the respective chambers and are thus able in combination with the resilient pads 77 and 79 adapted to be forced inwardly from each extremity to exert an axial pressure on the granular water conditioning material. Twenty foot-pounds pressure is sufficient for setting the screens 78 and 80 in conjunction with the corresponding screens at the proximal extremity. Where the screens are slightly oversized, pressure in the region of 15 to 20 p.s.i. may be maintained by the action of the screen members against the side walls of the cartridge. A conventional activated carbon useful in these devices has a packing density of 0.40 x 0.45 per ml., a mesh size of 12 x 30 (Tyler) and a hardness of 90% by the conventional Ball Abrasion Test. Another activated carbon material useful in these devices is a derivative of petroleum coke having a packing density of about the same magnitude as the preceding conventional activated carbon, a mesh size of 20 x 50 (Tyler) and a hardness greater than about 80% by the conventional Ball Abrasion Test. In the absence of such pressurizing means, or in augmentation thereof, any suitable means for exerting compressive force upon the granular material may be employed, for example, springs coacting between the screens and the respective closure members 71 and 72 at each extremity.

Longitudinal divider or web 73 is provided with an integral tubular body or hub 82 coextensive with the divider 73 and through which bolt 83 removably extends, the length of bolt 83 being sufficient to extend from the header 72 to the distal extremity of the tube 82 and to pass through the opening 84 in cap or closure 71 for threaded engagement with wing nut 85.

As shown in FIG. 6, screen 80 is recessed from the distal extremity of tube 70, and in the region of such recess divider or web 73 is provided with a port 86 to permit fluid exiting from the granular filter medium in chamber 74 to traverse the divider or web 73 for reverse flow through chamber 75. The divider wall port or orifice 86 is disposed in an offset position, preferably in one side of the divider 73 only in order to impart further turbulence and mixing of the aqueous medium for improved filtering or conditioning action.

FIG. 6a is a fragmentary cross-sectional view of another form of cross-over structure for transferring the fluid from the chamber 74 to the chamber 75. Web 73, instead of being provided with an aperture 86, is provided with a tube 87 for establishing communication between chambers 74 and 75 adjacent the end cap 71. The turbulence and mixing effect imposed upon the fluid in traversing the tube 87 aids in mixing the aqueous medium quite thoroughly before passage through the next filter bed in chamber 75, and has been found to aid in the minimizing of channelizing through the filter medium.

The distal closure 71 is provided with a suitable recess 90 adapted to receive and retain a gasket material for sealing the distal extremity of tube 70. The gasket conforms in shape to the terminal edges of the tubular body 70, the divider 73 and the axial tube 82 so that adequate sealing at the juncture between the closure 71 and the aforesaid extremities is complete. Raised portions 91 and 92 in cap 71 extend into chambers 74 and 75, respectively.

The opposite closure or proximal closure 72 is similarly configured for interlocking coaction with the longitudinal divider tube or hub 70 and is accordingly provided with a gasket receiving annular recess 93 and a divider tube or hub receiving recess 94. Suitable gasket material is disposed in recesses 93 and 94, preferably as a continuous gasket, for sealing coaction with the proximal extremities of tube 70, divider 73, and tube 82. In the same manner as the closure 71, raised portions 95 and 96 extend into chambers 73 and 75, respectively. Raised portion 95 is provided with fluid inlet means, e.g. port 97 which communicates with tapped bore 98 through which unconditioned or raw water enters replaceable cartridge 70. In like manner, raised portion 96 is provided with outlet means, e.g. outlet port 99 which communicates with a corresponding tapped bore on the opposite side of closure member 72, such tapped bore not being shown in FIG. 6. The inlet and outlet bores in header 72 do not communicate with each other so that a fluid entering through tapped bore 98 and inlet 97 must follow a course shown by the arrows in FIG. 8.

It will be seen, therefore, that the structure of the "in-line" device is essentially the same as the structure in the portable device, with minor exceptions. By removing the wing nut 85, closure 71 may be removed from the end of cartridge 70, and cartridge 70 disengaged from header 72 when the water conditioning materials contained therein have lost their effectiveness, and a similar cartridge replaced with ease. Instead of a replaceable cartridge having the structure shown in FIG. 6, there may also be used a cartridge having the structure shown in FIG. 3 with the exception that outlet means are provided in cap 71 instead of in closure 72.

Referring more particularly to FIGS. 9–11, inclusive, there is here shown details of another form of inlet-outlet header for a water filtration or conditioning apparatus of the type best adapted for permanent installation in a water line. This structure is conveniently cast as a unit or extruded from a convenient casting or extruding material such as polyethylene, polypropylene, or other such conventional material by conventional casting or extruding procedures. As shown in FIGS. 9–11 this alternative form of header is provided with a cover portion 100 having integrally cast therewith and extending from the outer surface thereof inlet elbow 101 and outlet elbow 102. Inlet elbow 101 is provided with internally threaded portion 103 for the reception and securing of a correspondingly externally threaded conduit, not shown. In like manner, outlet portion 102 is provided with an internally threaded portion 104 to which may be secured a conventional threaded plastic or metallic outlet pipe. Internal bores 105 and 106 extend through the cap 100 for communication with the divided interior of the water conditioning cartridge such as cartridge 70 of FIG. 6.

In order to secure the header of FIGS. 9–11 to a cartridge such as shown in FIG. 6, there is provided a central bore 107 extending through the cap and a nut receiving recess 108 extending inwardly from the upper surface 109 for receiving a correspondingly shaped nut on an elongated axial bolt, such as bolt 83 (FIG. 6). Recess 108 is so adapted and configured as to prevent rotation of the bolt during application of a wing nut such as wing nut 85 (FIG. 6) at the distal extremity thereof.

Cap 100 at its under surface 110 is provided with an axially extending skirt portion 111 which completely encircles cap 100 at its periphery. The inner opening of bore 105 is provided with a built-up rim 112 extending axially in the same direction as peripheral skirt 111. Rim 112 has extending from opposite sides thereof concentric arcuate ribs 113 and 114 which serve, not only to improve the rigidity of cap 100, but are also adapted to coact with corresponding ribs 115 and 116 extending from rim 117 surrounding outlet port 106. The distal extremities of the ribs 114 and 116 are spaced apart a distance sufficient to permit divider 73 to pass therebetween for proper positioning of the header on the cartridge body. In like manner, the distal extremities of ribs 113 and 115 are spaced apart for the same purpose. The resulting recess 110 in the undersurface of cap 100 is adapted to receive a gasket of a suitable resilient water insensitive material, e.g. rubber, to seal the extremity of the divided cartridge 70 (FIG. 6) and prevent by-passing of liquid from inlet 101 to outlet 102 without traversing the water conditioning material contained in the divided cartridge 70.

The header shown in FIGS. 9–11 is used and assembled in substantially the same manner as shown in FIGS. 6 and 8.

There has thus been provided a small scale water conditioning apparatus which is adapted for domestic or commercial use, and which is characterized by a removable cartridge containing in a divided chamber which is maintained under pressure, one or more water conditioning agents, preferably in granular form, and maintained under a compressive force or pressure. The division of the treating medium, and its maintenance under physically applied pressure, minimizes the channelizing effect of fluids flowing through the apparatus. The pressurizing effect may be brought about either by compressing retaining screens between a bolt head and a nut such as shown in FIG. 3, or by means of screens which are slightly oversized for the internal dimensions of the cartridge such as shown in FIG. 6, and forcing the screens into position under pressure, and allowing the peripheral edges thereof to bite into the side wall of the cartridge. When the cartridge has ceased to be effective for conditioning water flowing therethrough in the desired manner, it can be quickly and inexpensively replaced as an entire unit by merely removing the retaining wing nut of a device such as shown in FIGS. 6–8, or by merely removing the external housing in a device such as shown in FIG. 2. The materials of construction, e.g. polyethylene, or the like, readily lend themselves to rapid and inexpensive production so that the cost of the finished water conditioning apparatus is relatively quite low, and the cost of the replacement conditioner containing cartridges is such that the entire cartridge body and the retaining screens for reuse with fresh water conditioning granular material, e.g. fresh activated carbon granules.

Other modes of applying the principle of this invention may be employed instead of those specifically set forth above, changes being made as regards the details herein disclosed, provided the elements set forth in any of the following claims, or the equivalent of such be employed.

It is, therefore, particularly pointed out and distinctly claimed as the invention:

An apparatus for conditioning fluid from a source of fluid under pressure, comprising in combination:

(a) a base for resting on a generally horizontal surface independent of the source of fluid;
 (b) an elongated removable fluid impervious hollow cylindrical cartridge having opposing open ends and vertically disposed on the base, one of said opposing ends being in sealed relation with said base;
 (c) a transversely disposed resilient porous fibrous pad intermediate the extremities and dividing said hollow cartridge into two separate chambers;
 (d) granular water conditioner in each of said chambers;
 (e) transversely disposed resilient porous fibrous flow interrupting and distributing pads adjacent each extremity of the cartridge confining said granular water conditioner in each of said chambers;
 (f) relatively rigid metallic screens coacting adjacent each extremity of said cartridge to retain said flow interrupting and distributing pads within said cartridge;

(g) diametral spring metal retaining clips coacting between opposite sides of said cartridge adjacent each extremity thereof to forcibly compress the screens against the flow interrupting and distributing pads for placing the water conditioner in each chamber under compression;

(h) axial bolt and nut means coacting between said retaining clips to secure said clips to said screens under compression;

(i) a fluid impervious housing including a cap surrounding the cartridge and detachably mounted on the base holding the cartridge on the base, gasket means at each end of said cartridge providing sealed relation between the opposing open ends of the cartridge and the cap and base;

(j) a hollow rigid spout mounted on the cap for rotating in a plane normal to the longitudinal axis of the cartridge, said spout being in communication with the adjacent open end of said cartridge for carrying conditioned fluid away from said cartridge;

(k) a flexible hose extending from the base, and communicating with the adjacent open end of the cartridge for carrying fluid into the cartridge; and (l) a coupling secured to the end of the hose extending from the base for attachment to the source of fluid to divert fluid through the cartridge; and (m) means associated with the base for varying the length of hose extending from the base, including a spring biased reel on which the hose is reeved, mounted for rotation in a plane normal to the longitudinal axis of the cartridge.

References Cited

UNITED STATES PATENTS

| | | | |
|---|---|---|---|
| 315,463 | 4/1885 | Biggs | 210—286 X |
| 445,568 | 2/1891 | Millen | 210—286 X |
| 953,637 | 3/1910 | McCollom | 210—350 X |
| 2,017,456 | 10/1935 | Gudmundsen | 210—284 |
| 2,543,165 | 2/1951 | Harlan | 210—350 X |
| 2,605,901 | 8/1952 | Morrison et al. | 210—282 |
| 3,201,346 | 8/1965 | Benedict | 210—284 X |

SAMIH N. ZAHARNA, *Primary Examiner.*